US012603956B2

(12) United States Patent
Li et al.

(10) Patent No.: US 12,603,956 B2
(45) Date of Patent: *Apr. 14, 2026

(54) MAPPING A CONTACT CENTER SERVICE REQUEST TO A MODALITY

(71) Applicant: Zoom Communications, Inc., San Jose, CA (US)

(72) Inventors: Jin Li, Los Gatos, CA (US); Xu Hua Li, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/415,093

(22) Filed: Jan. 17, 2024

(65) Prior Publication Data

US 2024/0163373 A1      May 16, 2024

Related U.S. Application Data

(63) Continuation of application No. 17/587,599, filed on Jan. 28, 2022, now Pat. No. 11,909,918.

(51) Int. Cl.
 *H04M 3/00*      (2024.01)
 *H04M 3/51*      (2006.01)
 *H04M 3/523*      (2006.01)
(52) U.S. Cl.
 CPC ....... *H04M 3/5232* (2013.01); *H04M 3/5141* (2013.01); *H04M 3/5166* (2013.01); *H04M 3/5191* (2013.01)
(58) Field of Classification Search
 CPC ............. H04M 3/5232; H04M 3/5141; H04M 3/5166; H04M 3/5191

USPC ....... 379/265.01–265.14, 266.01–266.1, 309
See application file for complete search history.

(56) References Cited

U.S. PATENT DOCUMENTS

| | | | |
|---|---|---|---|
| 8,548,142 B2 | 10/2013 | Hariri et al. | |
| 9,762,733 B1 | 9/2017 | Ramanujaiaha et al. | |
| 9,992,608 B2 | 6/2018 | Malatack et al. | |
| 10,419,891 B2 | 9/2019 | Malatack et al. | |
| 10,652,195 B2 | 5/2020 | Rust, III et al. | |
| 10,728,392 B1 | 7/2020 | Chandrakant et al. | |
| 11,178,539 B1 | 11/2021 | Chau | |
| 11,632,655 B1 * | 4/2023 | Pereira .................. | H04W 76/50 |
| | | | 455/404.2 |
| 2005/0254638 A1 | 11/2005 | Mahajan et al. | |

(Continued)

*Primary Examiner* — William J Deane, Jr.
(74) *Attorney, Agent, or Firm* — Young Basile Hanlon & MacFarlane, P.C.

(57)      ABSTRACT

A universal contact center service access point is mapped to a service access point specific to a determined modality to establish a connection between a user device and a contact center operator device and associated with that modality. A request for a contact center engagement is obtained from a user device, in which the request includes a universal contact center service access point. Responsive to the request, the universal contact center service access point is mapped, based on a record associating multiple modalities with the universal contact center service access point, to a service access point specific to one of those multiple modalities determined based on information associated with the user device. The contact center engagement is then facilitated over a connection, established based on the mapping, between the user device and a contact center operator device associated with the service access point.

20 Claims, 8 Drawing Sheets

(56)                    References Cited

U.S. PATENT DOCUMENTS

| | | |
|---|---|---|
| 2006/0039359 A1 | 2/2006 | Pang |
| 2008/0249778 A1 | 10/2008 | Barton et al. |
| 2010/0265940 A1 | 10/2010 | Tenenti et al. |
| 2011/0142211 A1 | 6/2011 | Maes |
| 2014/0122154 A1 | 5/2014 | Kellogg et al. |
| 2018/0084111 A1 | 3/2018 | Pirat et al. |
| 2022/0191329 A1 | 6/2022 | Lew et al. |

* cited by examiner

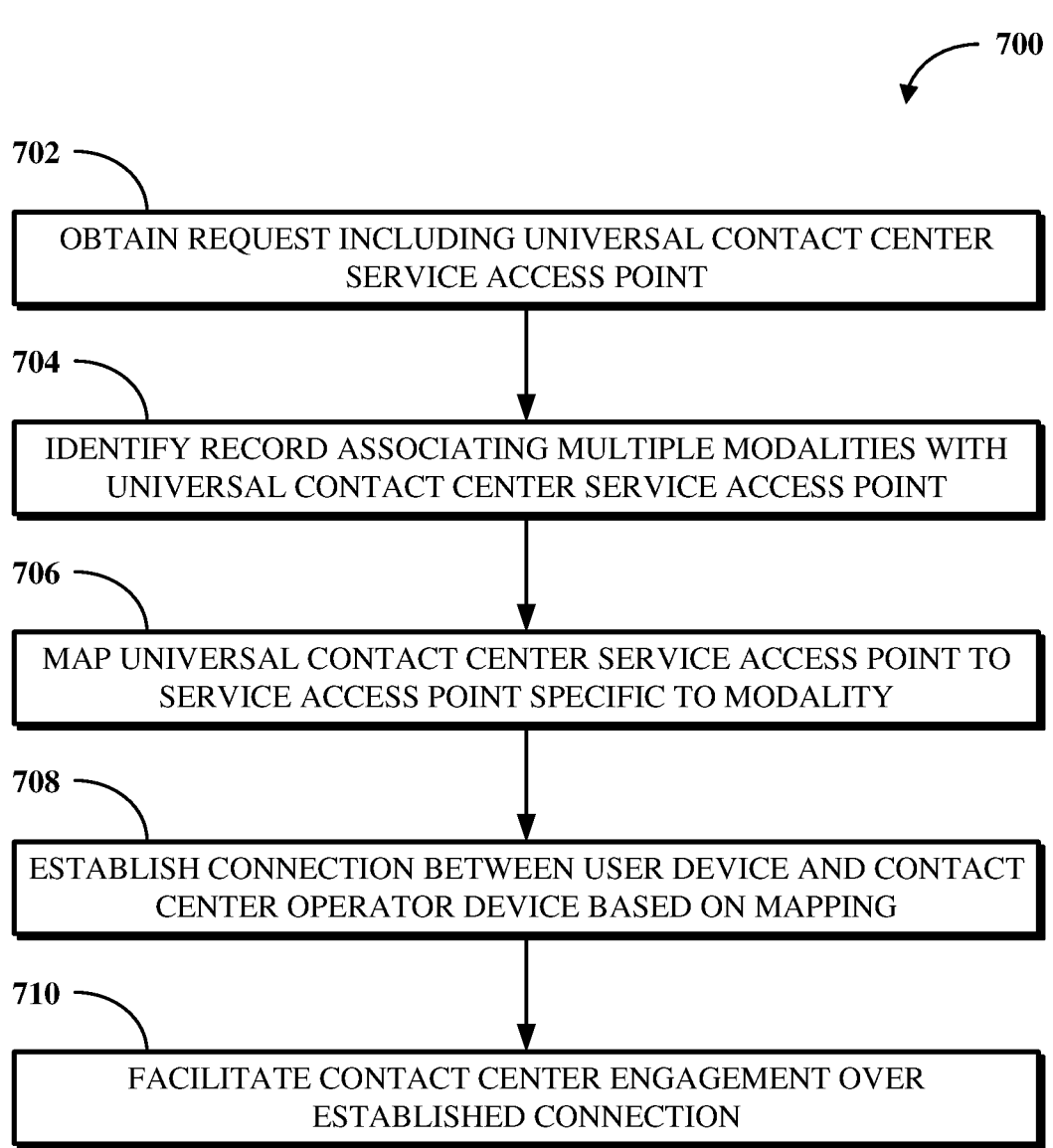

702 — OBTAIN REQUEST INCLUDING UNIVERSAL CONTACT CENTER SERVICE ACCESS POINT

704 — IDENTIFY RECORD ASSOCIATING MULTIPLE MODALITIES WITH UNIVERSAL CONTACT CENTER SERVICE ACCESS POINT

706 — MAP UNIVERSAL CONTACT CENTER SERVICE ACCESS POINT TO SERVICE ACCESS POINT SPECIFIC TO MODALITY

708 — ESTABLISH CONNECTION BETWEEN USER DEVICE AND CONTACT CENTER OPERATOR DEVICE BASED ON MAPPING

710 — FACILITATE CONTACT CENTER ENGAGEMENT OVER ESTABLISHED CONNECTION

FIG. 7

MAPPING A CONTACT CENTER SERVICE REQUEST TO A MODALITY

CROSS-REFERENCE TO RELATED APPLICATION(S)

This application is a continuation of U.S. application Ser. No. 17/587,599, filed Jan. 28, 2022, the entire disclosure of which is herein incorporated by reference.

FIELD

This disclosure generally relates to mapping a universal contact center service access point to a service access point specific to a determined modality.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flowchart of an example of a technique for mapping a multi-modal universal contact center service access point to a service access point specific to a determined modality.

DETAILED DESCRIPTION

Figure 1:
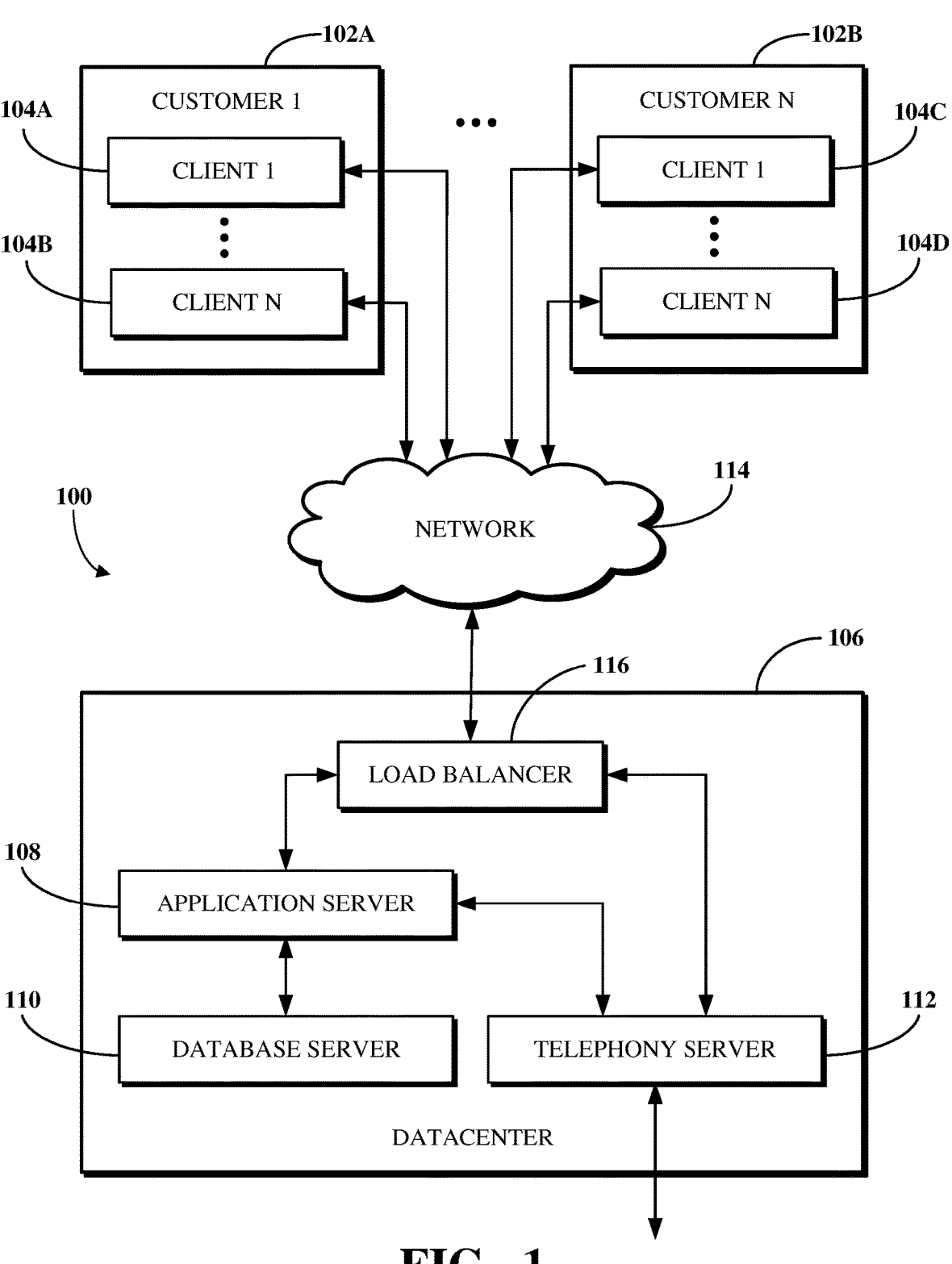
FIG. 1 is a block diagram of an example of an electronic computing and communications system.

The use of contact centers by or for service providers is becoming increasingly common to address customer support requests over various modalities, including telephony, video, text messaging, and chat. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

The most common modality used today to request a contact center engagement is telephony, and so in many cases these requests are initiated over phone calls. In a typical telephony use case, a contact center user dials a telephone number associated with a contact center and then inputs information, such as through an interactive voice response (IVR) menu or otherwise, to allow the system to route the call to the appropriate agent group. Once the call is routed to the appropriate agent group, it is queued until an agent of that agent group becomes available, at which point the call is distributed from the queue to the agent. The request processing may be different over different modalities. For example, to request a contact center engagement over the video modality (e.g., in which a private or semi-private video-enabled conference facilitates the discussion between a contact center user and a contact center agent), the contact center user may type a session initiation protocol (SIP) uniform resource locator (URL) into an address bar of a web browser and follow prompts to direct their request to the appropriate agent group.

Accordingly, each individual modality over which a contact center engagement may be facilitated typically requires a user to use a service access point (e.g., a telephone number, SIP URL, other web address, or email address) specific to that modality to access contact center services over that modality. For example, a specific telephone number must be dialed to access contact center services over the telephony modality. In another example, a SIP URL must be typed out or linked to access contact center services over the video modality. The use of these different service access points is required based on the differences in the backend systems which facilitate connections between user devices and the contact center system. Furthermore, it is generally either too complicated or too expensive and time consuming to modify these backend systems to use a universal service access point. However, these different service access points can be difficult for contact center users to keep track of and for an entity which operates a contact center to manage.

Implementations of this disclosure address problems such as these by mapping a universal contact center service access point to a service access point specific to a determined modality to establish a connection between a user device and a contact center operator device associated with that service access point. A request for a contact center engagement is obtained from a user device, in which the request includes a universal contact center service access point. Responsive to the request, the universal contact center service access point is mapped, based on a record associating multiple modalities with the universal contact center service access point, to a service access point specific to one of those multiple modalities determined based on information associated with the user device. The contact center engagement is then facilitated over a connection, established based on the mapping, between the user device and a contact center operator device associated with the service access point.

To describe some implementations in greater detail, reference is first made to examples of hardware and software structures used to implement a system for universal contact center service access point mapping. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
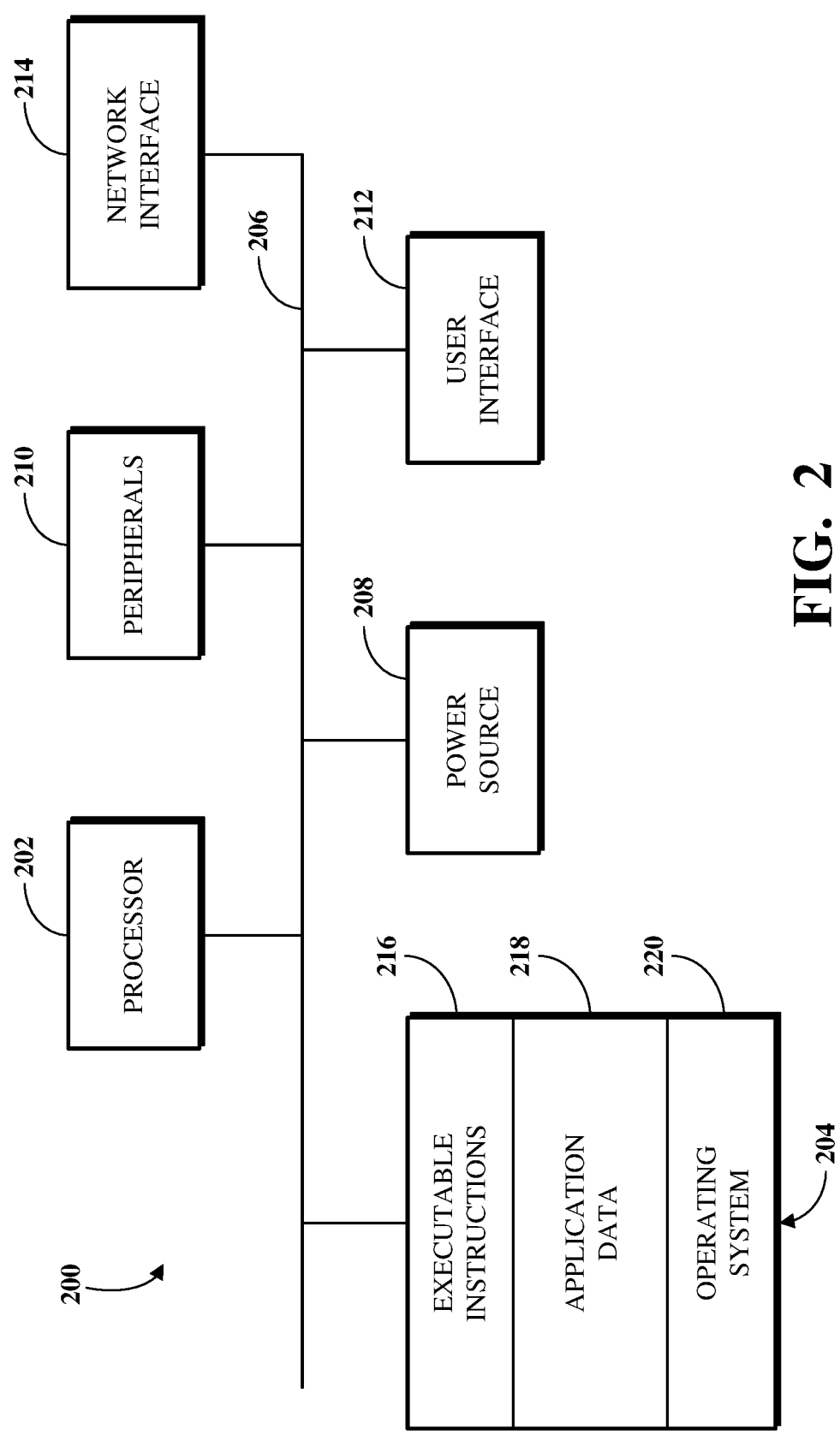
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
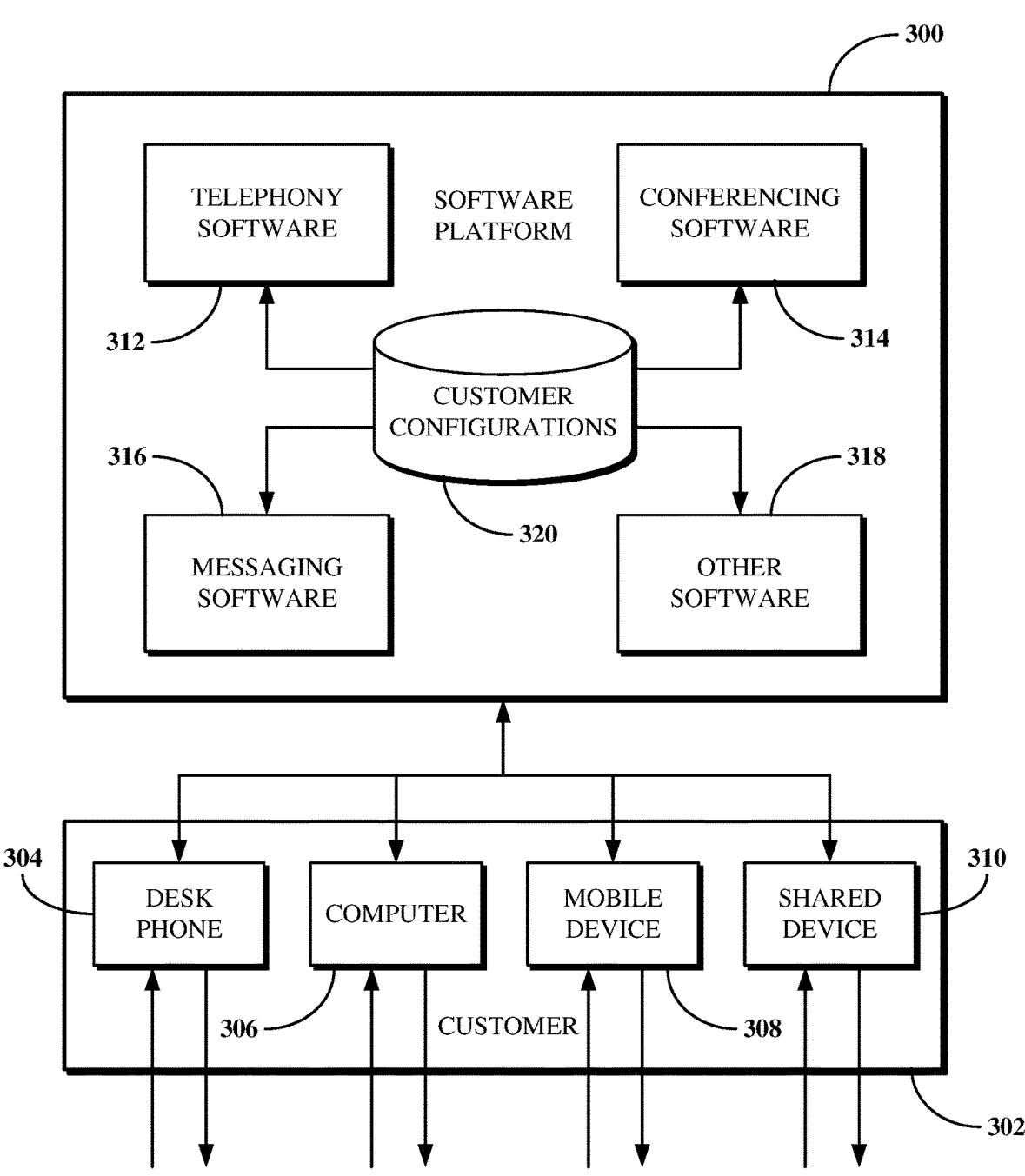
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for mapping a universal contact center service access point to a service access point for a specific communication modality.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
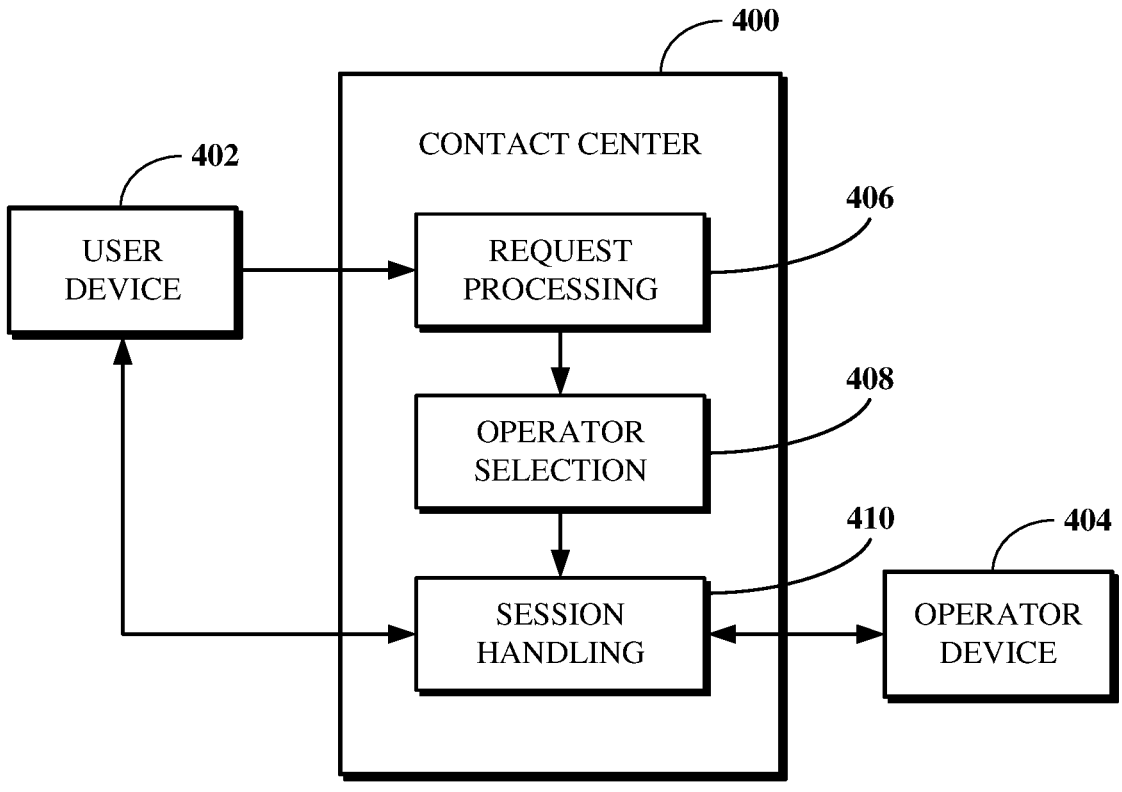
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an operator device 404 over one of multiple modalities available for use with the contact center 400. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, operator selection software 408, and session handling software 410.

The request processing software 406 processes a request for a contact center engagement initiated by the user device 402 to determine information associated with the request and information associated with the user device 402. The information associated with the request generally includes information identifying the purpose of the request and is usable to direct the request traffic to a contact center operator capable of addressing the request. The information associated with the request may include information obtained from a user of the user device 402 after the request is initiated. For example, for the telephony modality, the request processing software 406 may use an IVR menu to prompt the user of the user device 402 to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

The information associated with the user device 402 generally includes information usable to identify a device type of the user device 402, an operating system of the user device 402, and/or a software application used at the user device 402 to initiate the request for the contact center engagement. The information associated with the user device 402 may include information signaled by the user device 402 to the request processing software 406 within or otherwise in connection with the request and/or other information obtained by the request processing software 406 based on the request. For example, the user device 402 may in some cases signal, either directly or indirectly, that the request was initiated using one of a telephone application, a web browser application, or a text messaging application running at the user device 402. The request processing software 406 can use that directly or indirectly signaled information to determine the modality over which the user of the user device 402 wants to connect for the requested contact center engagement.

The operator selection software 408 uses output of the request processing software 406 including the information associated with the request and/or the information associated with the user device 402 to select a contact center operator to handle the request. The contact center operator may be a human operator, for example, an agent or a supervisor, or a non-human operator, for example, a chat bot or other bot. The operator selection software 408 may first determine an operator group associated with the category or sub-category of the purpose of the request (e.g., based on the information associated with the request) and/or with a modality over which to facilitate the requested engagement (e.g., based on the information associated with the user device 402). The operator selection software 408 may thereafter select an operator from that operator group based on one or more criteria, including operator skill set, operator availability, an operator selection policy (e.g., indicating to rotate in a particular way through a list of available operators), operator proficiency or scores, a combination thereof or the like.

Generally, an operator may belong to one operator group and be able to facilitate requests over one modality. For example, a contact center agent may only be part of an agent group that handles information technology-related requests over the telephony modality. However, in some cases, a given operator may belong to multiple operator groups and/or be able to facilitate requests over one or more modalities. For example, a contact center agent may be part of a first operator group that handles accounting-related requests over all of the telephony, video, chat, and text modalities. In another example, a contact center agent may be part of a first operator group that handles accounting requests over the telephony modality and part of a second operator group that handles information technology-related requests over the video modality. Generally, the operator selected by the operator selection software 408 will automatically be assigned the contact center engagement with the user device 402. However, in some implementations, the operator selection software 408 instead may prompt the selected operator to accept the contact center engagement with the user device 402 before assigning that contact center engagement to the selected operator.

The session handling software 410 establishes a connection between the user device 402 and the operator device 404, which is the device of the operator selected by the operator selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected operator associated with the operator device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the operator device 404 may be established using software available to a client application running at the user device 402. Alternatively, in some cases, the user device 402 may be other than a client device.

The operator device 404 is a device configured for use by a contact center operator. Where the contact center operator is a human, the operator device 404 is a device having a user interface. In some such cases, the operator device 404 may be a client device, for example, one of the clients 304 through 310, or a non-client device. In some such cases, the operator device 404 may be a server which implements software usable by one or more contact center operators to address contact center engagements requested by contact center users. Where the contact center operator is a non-human, the operator device 404 is a device that may or may not have a user interface. For example, in some such cases, the operator device 404 may be a server which implements software of or otherwise usable in connection with the contact center 400.

Although the request processing software 406, the operator selection software 408, and the session handling software 410 are shown as separate software components, in some implementations, some or all of the request processing software 406, the operator selection software 408, and the session handling software 410 may be combined. For example, the contact center 400 may be or include a single software component which performs the functionality of all of the request processing software 406, the operator selection software 408, and the session handling software 410. In some implementations, one or more of the request processing software 406, the operator selection software 408, or the session handling software 410 may be comprised of multiple software components. In some implementations, the contact center 400 may include software components other than the request processing software 406, the operator selection software 408, and the session handling software 410, such as in addition to or in place of one or more of the request processing software 406, the operator selection software 408, and the session handling software 410.

Figure 5:
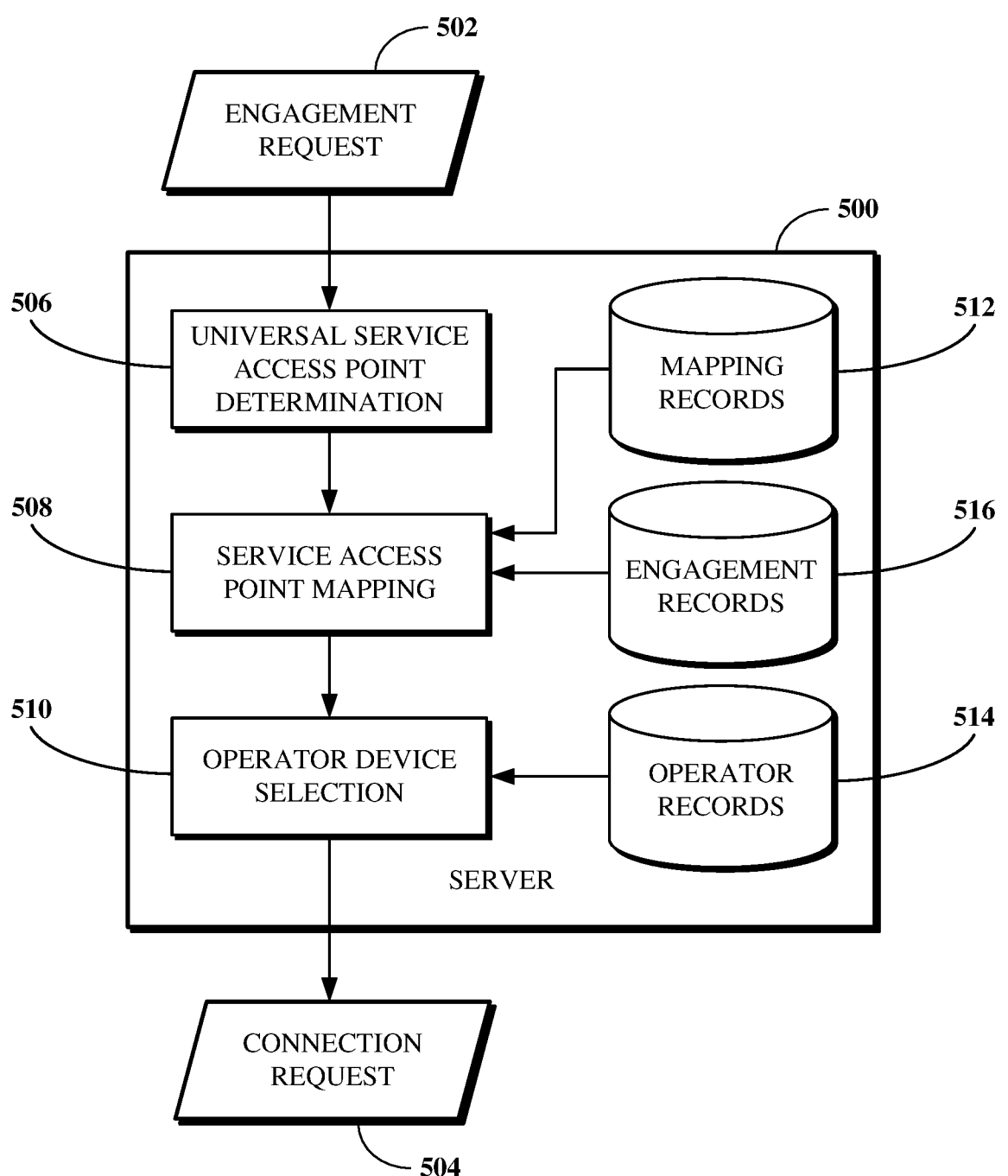
FIG. 5 is a block diagram of an example of a system for universal contact center service access point mapping.

FIG. 5 is a block diagram of an example of a system for universal contact center service access point mapping. The system includes a server 500 which runs software and stores data for the universal contact center service access point mapping. The server 500 obtains a request 502 for a contact center engagement from a user device (e.g., the user device 402 shown in FIG. 4) and transmits a request 504 to establish a connection with a contact center operator device to that contact center operator device (e.g., the operator device 404 shown in FIG. 4). The server runs software including universal service access point determination software 506, service access point mapping software 508, and operator device selection software 510. The server 500 may, for example, be a server of or otherwise used by a contact center, such as the contact center 400 shown in FIG. 4. For example, the universal service access point determination software 506 and the service access point mapping software 508 may be or be included in the request processing software 406 shown in FIG. 4. In another example, the operator device selection software 510 may be or be included in the operator selection software 408 shown in FIG. 4.

The universal service access point determination software 506 determines a universal service access point, also referred to herein as a universal contact center service access point, based on the request 502. In particular, the request 502 may include the universal service access point. The universal service access point is a service access point which is defined to be used to access any of multiple different modalities for a contact center. The universal service access point may, for example, be, include, or otherwise refer to a telephone number, a SIP URL, a web address other than for a SIP URL, an email address, or another alphanumeric string. Thus, the universal service access point may be identified by the request 502 itself or otherwise by the connection over which the request 502 is received, and so the universal service access point determination software 506 may determine the universal service access point based on the signaling or other transmission of the request 502 to the server 500.

The request 502 can be initiated over one or more channels depending on the subject modality. For example, where the universal service access point is a telephone number: the universal service access point may be dialed within phone software running at the user device to initiate the request 502 over the telephony modality; the telephone number can be typed into a field within a client application running at the user device to initiate a SIP transaction for the video modality, such as by the client application linking the typed telephone number to a SIP URL, or to initiate a chat message over the chat modality; the telephone number can be typed into an address bar of web browser software running at the user device as some or all of the destination address (e.g., "https://www.zoom.us/123-456-7890" or "https://123-456-7890.customernamegoeshere.com") to initiate a SIP transaction for the video modality by which the typed web address operates as a SIP URL and in which case the universal service access point functionally operates as a non-password-encoded conference identifier; or the universal service access point may be entered within the recipient field of text messaging software running at the user device to initiate the request 502 via a text message conversation over the text messaging modality or over the chat modality.

The service access point mapping software 508 maps the universal service access point to a service access point specific to a modality determined based on information associated with the user device from which the request 502 is obtained. The server 500 includes a mapping records data store 512 that stores one or more records associated with universal service access point. Each such record associates with a universal service access point with multiple service access points each corresponding to a different modality available for contact center engagements. Where the software 506 through 510 is configured for use with a single contact center operator, the mapping records data store 512 may store a single record. Where the software 506 through 510 is configured for use with multiple contact center operators, the mapping records data store 512 may store multiple records in which each such record corresponds to a different universal service access point defined for each operator.

A record of the mapping records data store 512 includes information usable to associate a subject universal service access point with each of multiple service access points, in which each of those multiple service access points is defined specifically for a different modality. For example, a record of the mapping records data store 512 may, in connection with a given universal service access point, identify a first service access point as a first telephone number defined for processing contact center engagement requests over the telephony modality, a second service access point as a second telephone number defined for processing contact center engagement requests over the text messaging modality, a third service access point as a SIP URL defined for processing contact center engagements over the video modality, and so on.

The service access point mapping software 508 obtains the information associated with the user device either directly from the user device (e.g., as part of the request 502) or from another software aspect which processes the request 502 before it (e.g., as output from or otherwise passed by the universal service access point determination software 506). The information associated with the user device indicates the modality over which the contact center engagement associated with the request 502 is to be facilitated. For example, where the information associated with the user device indicates that the request 502 is initiated using phone software running at the user device, the service access point mapping software 508 can determine that the modality is telephony and map the universal service access point to a service access point corresponding to the telephony modality as listed within the mapping records data store 512 record associated with the universal service access point. In another example, where the information associated with the user device indicates that the request 502 is initiated using text messaging software running at the user device, the service access point mapping software 508 can determine that the modality is text messaging and map the universal service access point to a service access point corresponding to the text messaging modality as listed within the mapping records data store 512 record associated with the universal service access point. In yet another example, where the information associated with the user device indicates that the request 502 is initiated using a SIP URL from a client application or web browser software running at the user device, the service access point mapping software 508 can determine that the modality is video and map the universal service access point to a service access point corresponding to the video modality as listed within the mapping records data store 512 record associated with the universal service access point.

Figure 6:
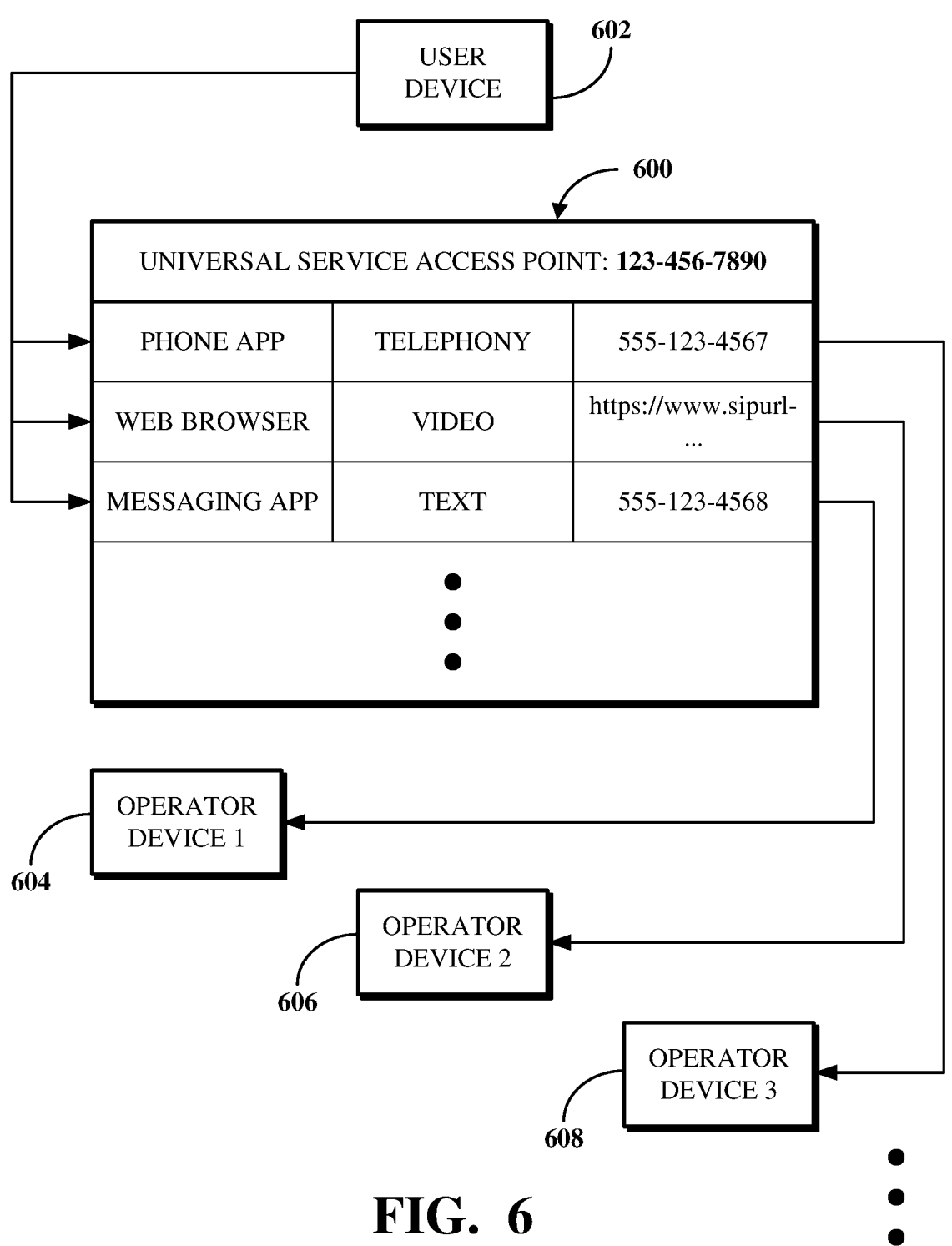
FIG. 6 is an illustration of an example of a record used to map a universal contact center service access point to service access points for multiple modalities.

Referring to FIG. 6, an illustration of an example of a record 600 used to map a universal contact center service access point to service access points for multiple modalities is shown. The record 600, which may, for example, be a record of the mapping records data store 512 shown in FIG. 5, lists service access points specific to various modalities, each associated with the same universal service access point. As shown, the record 600 corresponds to the universal service access point 123-456-7890. The universal service access point is determined based on a request obtained from a user device 602, which may, for example, be the user device 402 shown in FIG. 4. A first listing in the record 600 corresponds to the telephony modality and indicates that requests received over this modality, which may, for example, be determined based on a request initiation using phone software, are to be mapped to the service access point 555-123-4567. A second listing in the record 600 corresponds to the video modality and indicates that requests received over this modality, which may, for example, be determined based on a request initiation using web browser software, are to be mapped to the service access point https://www.sipurl-example-sipurl.com/subdomain. A third listing in the record 600 corresponds to the text messaging modality and indicates that requests over this modality, which may, for example, are to be determined based on a request initiation using messaging software, should be mapped to the service access point 555-123-4568.

Referring back to FIG. 5, the operator device selection software 510 selects an operator device with which to establish a connection with the user device from which the request 502 is received based on the service access point to which the universal service access point is mapped. The contact center may be configured so that certain contact center operators are deployed to handle certain modalities for contact center engagement requests such as the request 502. For example, some contact center agents may be deployed to handle only requests over the telephony modality or the video modality. In some cases, contact center operators may belong to an operator group which is deployed to handle a certain modality. Records associated with contact center operators can be obtained by the operator device selection software 510 from an operator records data store 514. The operator device selection software 510 may using one or more records from the operator records data store 514 to select an operator device corresponding to an operator who is deployed to handle requests over the specific modality associated with the mapped service access point. For example, an operator selection policy (e.g., indicating to rotate in a certain order through a list of available operators) may be used by the operator device selection software 510 to select a next operator device according thereto.

In some implementations, the operator device selection software 510 may select the operator device based on both of the service access point to which the universal service access point is mapped and information associated with the request 502. For example, the information associated with the request 502 can indicate a purpose of the request, such as a category or sub-category of customer support sought by the user of the user device. Where the contact center supports multiple categories of customer support, this may be useful to guide the request 502 to a contact center operator having skill or other proficiency in the category or sub-category related to the request 502. Such skills or other proficiencies and/or other information associated with categories or sub-categories of customer support associated with a given operator may be determined based on one or more records within the operator records data store 514. In some such implementations, the operators who may be considered for selection by the operator device selection software 510 may first be filtered based on the service access point and thereafter again based on the information associated with the request 502. In other such implementations, the operators may first be filtered based on the information associated with the request 502 and thereafter based on the service access point.

The operator device selection software 510 outputs the request 504, which is configured to establish a connection between the selected operator device and the user device from which the request 502 is obtained over the modality corresponding to the mapped service access point. For example, the request 504 can be used to establish a connection, and the established connection can be used to facilitate the contact center engagement associated with the request 502, as described with respect to the session handling software 410 shown in FIG. 4. For example, as shown in FIG. 6, a first operator device 604 is shown as selected for the telephony modality engagement, a second operator device 606 is shown as selected for the video modality engagement, and a third operator device 608 is shown as selected for the text messaging modality. Any of the operator devices 604 through 608 may, for example, be the operator device 404 shown in FIG. 4. In some implementations, one or more of the operator devices 604 through 608 may be selected based on both the modality corresponding to the subject engagement and information associated with the request obtained from the user device 602, such as which can be used to determine a category or sub-category of the request.

In some implementations, the service access point mapped to the universal service access point based on the request 502 can be used to initiate an outbound communication from the contact center device (e.g., from the selected operator device or another operator device) to the user device from which the request 502 is obtained. For example, a contact center operator may ask that the contact center user disconnect from the engagement briefly so that the contact center operator can internally investigate an aspect related to the request 502. In such a case, the outbound communication, when received at the user device, may be reported as the universal service access point to ensure that the identification is familiar to the contact center user. For example, where the universal service access point is a telephone number dialed by the user to access the contact center over the telephony modality, the outbound communication to the user device can be a telephone call appearing to be from the universal service access point. A connection is established between the user device and the contact center device from which the outbound communication is sent responsive to the user of the user device accepting the outbound communication at the user device.

In some situations, the contact center user associated with the user device from which the request 502 is obtained may intentionally or unintentionally disconnect from the operator device connected to the engagement based on the request 504. For example, the contact center user may intend to switch to a different modality not compatible with the user device after discussing the subject of his or her request 502 with the contact center operator. In another example, a power or network outage may prevent the contact center user from further using the user device. In yet another example, the contact center user may enter a situation in which it would be impractical or undesirable to continue the engagement over the current modality. The system can store information associated with recent contact center engagements using records of an engagement records data store 516.

A record of the engagement records data store 516 may associate one or more of a user device connected to a recent engagement, a user of that user device, or a start and/or end time of that recent engagement with information usable to determine a second modality to which to map the universal service access point upon a subsequent request for a contact center engagement from either the user or the user device. The information usable to determine the second modality to which to map the universal service access point can include one or more of an excerpt of a transcription from the recent engagement in which the user and/or the agent suggests using a different modality to resolve the customer support item associated with the recent engagement, an indication to compare an identifier associated with the user device used for the recent engagement against information associated with a user device from which the subsequent engagement request is initiated, or the like. For example, a transcription excerpt may refer to fragments or other portions of a discussion between the contact center user and the contact center operator in which one or both of them suggests use of a different modality. This may be prudent where the contact center operator can more easily resolve the customer support item associated with the recent engagement over, for example, video than the operator could over telephony. In another example, an indication to compare user device identifiers can be used to determine whether a different user device associated with the original user device is being used. The various user devices may, for example, be associated by a common user account.

In some implementations, the use of a record of the engagement records data store 516 may be based on the subsequent engagement being within a threshold period of time of the recent engagement. For example, an implication may be drawn that a different modality should be used for the subsequent engagement if the subsequent engagement begins within N (e.g., 5) minutes of when the recent engagement ends. However, if much more time has passed between those events (e.g., a full day), the system may consider this gap to have been due to user behavior rather than a modality change suggestion or an incapacitating outage.

Although each of the software 506 through 510 and the data stores 512 through 516 are shown as being on the server 500, in some implementations, multiple servers may be used for the software 506 through 510 and/or for the data stores 512 through 516. For example, a first server may run the software 506 through 510 and a second server may include the data stores 512 through 516. In another example, a first server may run the software 506 and 508 and include the data stores 512 and 516 and a second server may run the software 510 and include the data store 514.

Figure 8:
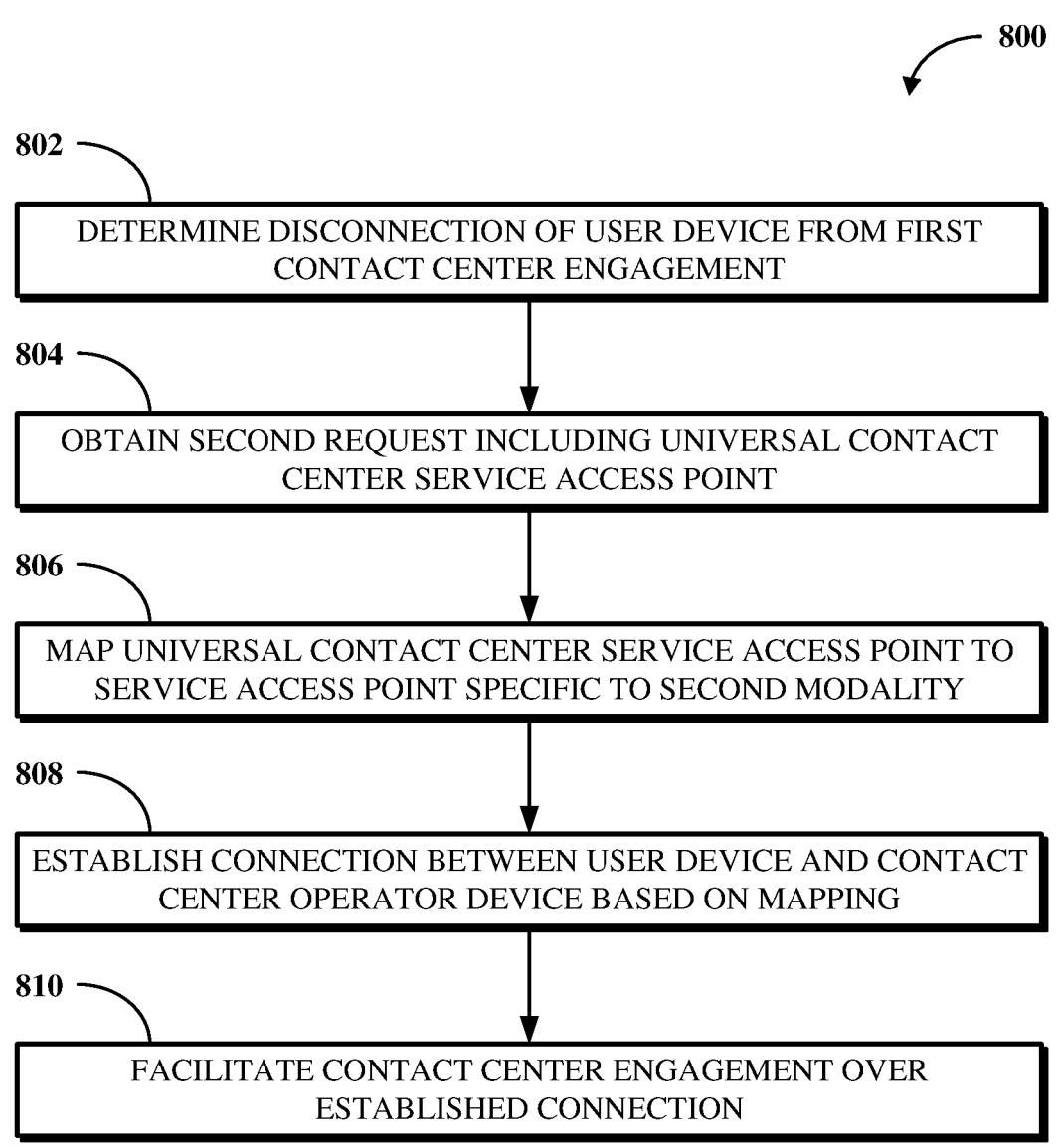
FIG. 8 is a flowchart of an example of a technique for determining a new modality to which to map to a universal contact center service access point during a subsequent contact center engagement of a user.

To further describe some implementations in greater detail, reference is next made to examples of techniques which may be performed by or using a system for universal contact center service access point mapping. FIG. 7 is a flowchart of an example of a technique 700 for mapping a universal contact center service access point to a service access point for a specific communication modality. FIG. 8 is a flowchart of an example of a technique 800 for determining a new modality to which to map to a universal contact center service access point during a subsequent contact center engagement of a user.

The technique 700 and/or the technique 800 can be executed using computing devices, such as the systems, hardware, and software described with respect to FIGS. 1-6. The technique 700 and/or the technique 800 can be performed, for example, by executing a machine-readable program or other computer-executable instructions, such as routines, instructions, programs, or other code. The steps, or operations, of the technique 700 and/or the technique 800 or another technique, method, process, or algorithm described in connection with the implementations disclosed herein can be implemented directly in hardware, firmware, software executed by hardware, circuitry, or a combination thereof.

For simplicity of explanation, the technique 700 and the technique 800 are each depicted and described herein as a series of steps or operations. However, the steps or operations in accordance with this disclosure can occur in various orders and/or concurrently. Additionally, other steps or operations not presented and described herein may be used.

Furthermore, not all illustrated steps or operations may be required to implement a technique in accordance with the disclosed subject matter.

Referring first FIG. 7, the technique 700 for mapping a universal contact center service access point to a service access point for a specific communication modality is shown. At 702, a request for a contact center engagement is obtained from a user device. The request includes a universal contact center service access point used at the user device to initiate the request. The request is obtained over a channel based on the manner by which the universal contact center service access point is used at the user device. In one example, the request is initiated by the universal contact center service access point being entered into a client application or a web browser running at the user device. In another example, the request is initiated by the universal contact center service access point being dialed using phone software running at the user device. Many other examples are possible.

At 704, a record associating multiple modalities with the universal contact center service access point is identified responsive to the request. In particular, the record is a maps the universal contact center service access point to each of multiple service access points in which each of those service access points corresponds to a different modality over which communications with a contact center operator may be facilitated. The record may be identified based on the universal contact center service access point, such as by querying a data store that stores the record using the universal contact center service access point. The multiple modalities identified within the record include at least two of telephony, video, text message, or chat. In some cases, the multiple modalities may be implemented using the same or different software of a software platform, for example, a UCaaS platform.

At 706, the universal contact center service access point is mapped to a service access point specific to a modality determined for the contact center engagement based on the record. Mapping the universal contact center service access point to the service access point specific to a modality includes determining that modality. Determining that modality can include using at least one of information associated with the request for the contact center engagement or information associated with the user device. The information associated with the user device is obtained with the request. For example, the information associated with the device may correspond to a channel over which the request is obtained and/or identify at least one of software used at the user device to initiate the request or a device type of the user device. Thus, the universal contact center service access point may be mapped to a particular service access point identified within the record based at least one of information associated with the request for the contact center engagement or information associated with the user device.

The particular types of the universal contact center service access point and a given service access point to which it is mapped may vary based on the subject contact center and the manner by which a subject contact center user seeks to access the subject contact center. In one example, the universal contact center service access point corresponds to a telephone number and the service access point corresponds to a SIP URL. In another example, the universal contact center service access point corresponds to an alphanumeric string (e.g., representing a name of a company which operates the subject contact center or for which the subject contact center is otherwise implemented, such as by a software platform provider) entered within one of a client application or a web browser running at the user device and the service access point corresponds to a chat identifier. Many other examples are possible.

At 708, a connection is established between the user device and a contact center operator device associated with the service access point based on the mapping. Establishing the connection between the user device and the contact center operator device includes routing the request for the contact center engagement obtained from the user device to a contact center operator device (e.g., a contact center agent device) to establish a private session between the contact center operator device and the user device. In some cases, the private session can be established by a server opening a channel between the contact center operator device and the user device over the modality corresponding to the mapped service access point. For example, where the modality is video, conferencing software can be used to create the private session.

The contact center operator device is selected based on at least one of information associated with the request or the modality determined for the contact center engagement (i.e., the modality corresponding to the mapped service access point). Selecting the contact center operator device can include selecting a contact center operator and then determining a device (i.e., a contact center operator device) associated with that contact center operator. For example, the contact center operator (and thus the contract center operator device) may be associated with one or more categories or sub-categories of customer support, such as based on skills or other proficiencies of the contact center operator. In some cases, the contact center operator may belong to an operator group which is associated with one or more categories or sub-categories. Furthermore, in some cases, the contact center operator (and thus the contact center operator device) may be selected according to an operator selection policy in place for the contact center and/or for an operator group that includes the contact center operator, as applicable. The contact center operator may be a human or a non-human. For example, where the contact center operator is a human, such as a human agent or supervisor, the contact center operator device may be a mobile device or a desktop computer registered (e.g., with the contact center) for use by the contact center operator. In another example, where the contact center operator is a non-human, such as a non-human agent or chatbot, the contact center operator device may be a server. In such a case, the selection of the contact center device may include routing the request to the server which implements the non-human agent or chatbot.

At 710, the contact center engagement is facilitated over the connection established between the user device and the contact center operator device. Facilitating the contact center engagement includes enabling a discussion, via the subject modality, between the contact center user (e.g., as the user of the user device) and the contact center operator (e.g., as the human or non-human user of the contact center operator device) over the established connection, which may in at least some cases be or include a private session between those devices.

In some implementations, the mapping of the universal contact center service access point to the service access point based on the record can be used to configure outbound communications from the contact center operator device or another device associated with the service access point to identify the universal contact center service access point. For example, when the user device receives an outbound communication from the same contact center operator device as was selected for the contact center engagement or from another contact center operator device, the configured outbound communication may cause the user device to display the universal contact center service access point in place of the service access point (e.g., within a caller id section of a user interface where the outbound communication is over the telephony modality or within a conference invitation indicated within a user interface a client application where the outbound communication is over the video modality). In some cases, the outbound communication may be responsive to a termination of the connection established between the user device and the contact center operator device, such as where the outbound communication is within some period of time of the termination. In some cases, the outbound communication may occur more than after that period of time of the termination.

Referring next to FIG. 8, the technique 800 for determining a new modality to which to map to a universal contact center service access point during a subsequent contact center engagement of a user is shown. At 802, a disconnection of a user device from a first contact center engagement or other termination of the connection used for the first contact center engagement is determined. The first contact center engagement may, for example, be the contact center engagement requested, processed, and facilitated with respect to the technique 700. The disconnection may be intentional or unintentional. For example, determining the disconnection of the user device can include determining that the user device is no longer connected to a private session with the contact center operator device involved in the first contact center engagement. In another example, determining the disconnection of the user device can include determining that a channel previously opened between user device and the contact center operator device involved in the first contact center engagement has closed.

At 804, a request for a second contact center engagement (e.g., a second request) is obtained. The request for the second contact center engagement includes the same universal contact center service access point included in the request for the first contact center engagement (e.g., the first request). The second request may be obtained from the same user device from which the first request was obtained. Alternatively, the second request may be obtained from another user device. For example, the other user device may be a device associated with the same contact center user as the user device from which the first request was obtained. An association between devices and/or contact center users may be determined based on records associated with user accounts, such as of the contact center, a software platform which implements the contact center, or the like.

At 806, the universal contact center service access request is mapped to a service access point specific to a second modality (e.g., in which the modality used for the first contact center engagement is a first modality) determined based on the second request. In particular, a record of a recent engagement—the first contact center engagement, in this case—may be accessed and used to determine the second modality. The record of the first contact center engagement includes information usable to determine the second modality. For example, the record of the first contact center engagement can include notes from at least one of the contact center user or the contact center operator indicating a preference to continue the discussion related to the first contact center engagement over a different modality. In another example, the record of the first contact center engagement can include some or all of a transcription of the first contact center engagement indicating words spoken or text written by at least one of the contact center user or the contact center operator indicating a preference to continue the discussion related to the first contact center engagement over a different modality. Natural language processing may be performed to determine such a preference in either case. In some cases, the output of the natural language processing can be processed by a machine learning model trained for conversational context recognition to determine such a preference in either case.

In some implementations, the second request may only be mapped according to a transcription of the first contact center engagement or other information as may be included within a record of the first contact center engagement where the second request is obtained within a threshold period of time of an end of the first contact center engagement. For example, where the second request is obtained after the threshold period of time expires, the mapping of the second request may be performed as described above with respect to the mapping of the first request as part of the technique 700. Thus, in such a case, the mapping of the second request may not take recent engagements into account.

At 808, a connection is established between the user device from which the second request is obtained and a contact center operator device. The contact center operator device with which the connection is established may be the same contact center operator device as was involved in the previous contact center engagement or a different contact center operator device. For example, in some cases, a different contact center operator may be selected to handle the second request, such as where the contact center operator selected to handle the first request is unavailable at the time of the second request. The connection between the user device from which the second request is obtained and the subject contact center operator device may be established as described above with respect to the technique 700.

At 810, the second contact center engagement is facilitated over the connection established between the user device from which the second request is obtained and the subject contact center operator device. Facilitating the contact center engagement includes enabling a discussion, via the second modality, between the contact center user (e.g., as the user of the user device) and the contact center operator (e.g., as the human or non-human user of the contact center operator device) over the established connection, which may in at least some cases be or include a private session between those devices.

In some implementations, some or all of the technique 700 and the technique 800 may be combined. For example, some or all of the technique 800 may be performed after the facilitation of the contact center engagement, as the first contact center engagement, at 710 within the technique 700.

The implementations of this disclosure correspond to methods, non-transitory computer readable media, apparatuses, systems, devices, and the like. In some implementations, a method comprises obtaining a request for a contact center engagement from a user device, the request including a universal contact center service access point; responsive to the request, mapping, based on a record associating multiple modalities with the universal contact center service access point, the universal contact center service access point to a service access point specific to one of the multiple modalities determined based on information associated with the user device; and facilitating the contact center engagement over a connection, established based on the mapping, between the user device and a contact center operator device associated with the service access point. In some implementations, a non-transitory computer readable medium stores instructions operable to cause one or more processors to perform operations comprising obtaining a request for a contact center engagement from a user device, the request including a universal contact center service access point; responsive to the request, mapping, based on a record associating multiple modalities with the universal contact center service access point, the universal contact center service access point to a service access point specific to one of the multiple modalities determined based on information associated with the user device; and facilitating the contact center engagement over a connection, established based on the mapping, between the user device and a contact center operator device associated with the service access point. In some implementations, an apparatus comprises a memory and a processor configured to execute instructions stored in the memory to obtain a request for a contact center engagement from a user device, the request including a universal contact center service access point; responsive to the request, map, based on a record associating multiple modalities with the universal contact center service access point, the universal contact center service access point to a service access point specific to one of the multiple modalities determined based on information associated with the user device; and facilitate the contact center engagement over a connection, established based on the mapping, between the user device and a contact center operator device associated with the service access point.

In some implementations of the method, non-transitory computer readable medium, and/or apparatus, the universal contact center service access point corresponds to a telephone number and the service access point corresponds to a session initiation protocol uniform resource locator.

In some implementations of the method, non-transitory computer readable medium, and/or apparatus, the request is initiated by the universal contact center service access point being entered into a client application or a web browser running at the user device.

In some implementations of the method, non-transitory computer readable medium, and/or apparatus, the information associated with the user device identifies at least one of software used at the user device to initiate the request or a device type of the user device.

In some implementations of the method, non-transitory computer readable medium, and/or apparatus, the contact center operator device is a contact center agent device, and establishing the connection between the user device and the contact center operator device comprises routing the request to the contact center agent device to establish a private session between the contact center agent device and the user device.

In some implementations of the method, non-transitory computer readable medium, and/or apparatus, the mapping configures an outbound communication, to the user device from the contact center operator device or another device associated with the service access point, to identify the universal contact center service access point at the user device in place of the service access point.

In some implementations of the method, non-transitory computer readable medium, and/or apparatus, the information associated with the user device is obtained with the request.

In some implementations of the method, non-transitory computer readable medium, and/or apparatus, the information associated with the user device corresponds to a channel over which the request is obtained.

In some implementations of the method, non-transitory computer readable medium, and/or apparatus, the operations comprise establishing, based on a termination of the connection, a second connection between the user device and the contact center operator device via an outbound communication from the contact center operator device to the user device, wherein the outbound communication identifies the universal contact center service access point at the user device.

In some implementations of the method, non-transitory computer readable medium, and/or apparatus, the operations comprise, based on a second contact center engagement including the universal contact center service access point initiated, determining a second service access point specific to a second one of the multiple modalities to which to map the universal contact center service access point.

In some implementations of the method, non-transitory computer readable medium, and/or apparatus, the operations comprise establishing, based on a disconnection of the user device from the connection, a second connection between the user device and one of the contact center operator device or a different contact center operator device based on a second request initiated for a second modality different from the one of the multiple modalities determined for the request, wherein the second request includes the universal contact center service access point and is processed to map the universal contact center service access point to a second service access point specific to the second modality based on the record associating the multiple modalities with the universal contact center service access point.

In some implementations of the method, non-transitory computer readable medium, and/or apparatus, the multiple modalities include at least two of telephony, video, text message, or chat.

In some implementations of the method, non-transitory computer readable medium, and/or apparatus, the processor is configured to execute the instructions to determine a second service access point to which to map the universal contact center service access point during a second contact center engagement requested from a user of the user device based on a transcription of the contact center engagement.

In some implementations of the method, non-transitory computer readable medium, and/or apparatus, the processor is configured to execute the instructions to determine a second service access point to which to map the universal contact center service access point during a second contact center engagement requested from a user of the user device within a threshold period of time of an end of the contact center engagement.

In some implementations of the method, non-transitory computer readable medium, and/or apparatus, the processor is configured to execute the instructions to select the contact center operator device based on at least one of information associated with the request or the one of the multiple modalities.

In some implementations of the method, non-transitory computer readable medium, and/or apparatus, the universal contact center service access point corresponds to an alphanumeric string entered within one of a client application or a web browser running at the user device, and wherein the service access point corresponds to a chat identifier.

In some implementations of the method, non-transitory computer readable medium, and/or apparatus, the contact center operator device is a server and a contact center operator associated with the contact center operator device is a chat bot.

In some implementations of the method, non-transitory computer readable medium, and/or apparatus, the multiple modalities are implemented using software of a unified communications as a service platform.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

mapping, based on a request from a user device to an access point associated with multiple modalities, the request to a contact center service associated with one of the multiple modalities, the multiple modalities including at least two of telephony, video, text message, or chat; and establishing, based on the mapping, a connection between the user device and a device associated with the contact center service.

2. The method of claim 1, comprising:

obtaining the request via software at the user device based on a manner by which the access point is used at the user device-.

3. The method of claim 1, wherein mapping the request to the contact center service comprises:

identifying a record associating the access point with multiple service access points each corresponding to a different modality of the multiple modalities.

4. The method of claim 1, wherein mapping the request to the contact center service comprises:

determining a service access point associated with the contact center service based on information associated with one or more of the request or the user device.

5. The method of claim 1, wherein establishing the connection between the user device and the device comprises:

routing the request to the device to establish the connection as a private session between the user device and the device.

6. The method of claim 1, wherein establishing the connection between the user device and the device comprises:

determining the device based on one or more of the request or a modality determined for the request based on the mapping.

7. The method of claim 1, wherein the access point corresponds to a telephone number and the request is mapped to a session initiation protocol uniform resource locator associated with the contact center service.

8. The method of claim 1, wherein the access point corresponds to an alphanumeric string and the request is mapped to a chat identifier associated with the contact center service.

9. A non-transitory computer readable medium storing instructions operable to cause one or more processors to perform operations comprising:

mapping, based on a request from a user device to an access point associated with multiple modalities, the request to a contact center service associated with one of the multiple modalities, the multiple modalities including at least two of telephony, video, text message, or chat; and establishing, based on the mapping, a connection between the user device and a device associated with the contact center service.

10. The non-transitory computer readable medium of claim 9, wherein mapping the request to the contact center service comprises:

querying a data store for a record associating the access point with multiple service access points each corresponding to a different one of the multiple modalities.

11. The non-transitory computer readable medium of claim 9, wherein the device is a contact center agent device and the connection is a private session between the user device and the contact center agent device established by routing the request based on the mapping.

12. The non-transitory computer readable medium of claim 9, wherein the device is selected based on a category of customer support associated with the request.

13. The non-transitory computer readable medium of claim 9, wherein the request identifies the access point via a telephone number or an alphanumeric string.

14. An apparatus, comprising:

a memory; and a processor configured to execute instructions stored in the memory to:

map, based on a request from a user device to an access point associated with multiple modalities, the request to a contact center service associated with one of the multiple modalities, the multiple modalities including at least two of telephony, video, text message, or chat; and establish, based on the mapping, a connection between the user device and a device associated with the contact center service.

15. The apparatus of claim 14, wherein the request is obtained via one of a client application, a web browser, or phone software at the user device.

16. The apparatus of claim 14, wherein the device is a contact center agent device selected based on one or more of information associated with the request or a modality determined for the request based on the mapping.

17. The apparatus of claim 14, wherein the device is a server and an operator of the device is a non-human agent or chatbot.

18. The apparatus of claim 14, wherein a service access point associated with the contact center service is determined based on information associated with one or more of the request or the user device.

19. The apparatus of claim 14, wherein the request is routed to the device to establish the connection over a private session.

20. The apparatus of claim 14, wherein the multiple modalities are implemented using software of a unified communications as a service platform.

* * * * *